No. 824,220. PATENTED JUNE 26, 1906.
E. T. WAITE.
LENS DRILLING MACHINE.
APPLICATION FILED NOV. 16, 1905.
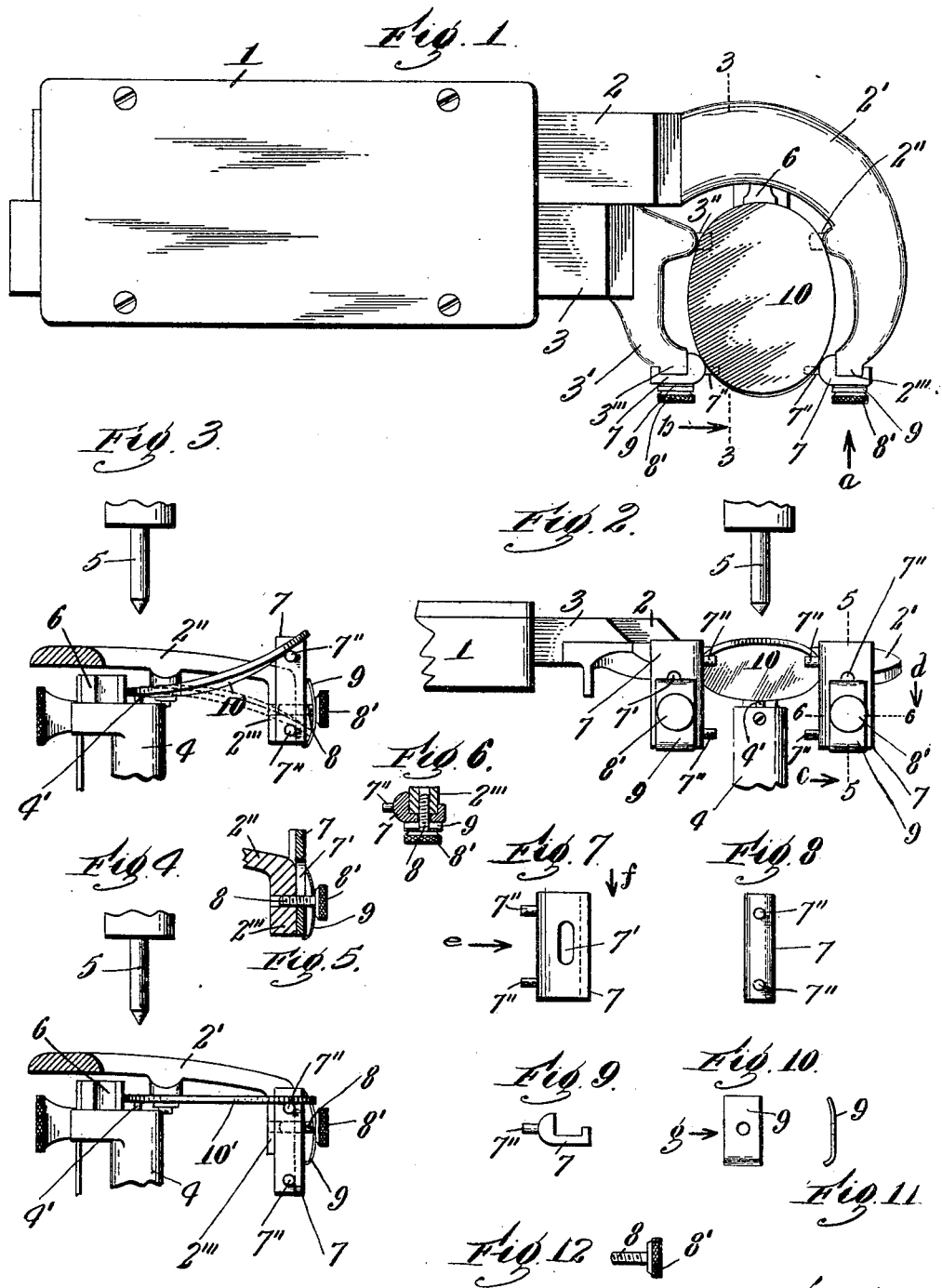

UNITED STATES PATENT OFFICE.

EDGAR T. WAITE, OF SOUTHBRIDGE, MASSACHUSETTS, ASSIGNOR TO AMERICAN OPTICAL COMPANY, OF SOUTHBRIDGE, MASSACHUSETTS, A CORPORATION OF MASSACHUSETTS.

LENS-DRILLING MACHINE.

No. 824,220.     Specification of Letters Patent.     Patented June 26, 1906.

Application filed November 16, 1905. Serial No. 287,617.

*To all whom it may concern:*

Be it known that I, EDGAR T. WAITE, a citizen of the United States, residing at Southbridge, in the county of Worcester and State of Massachusetts, have invented certain new and useful Improvements in Lens-Drilling Machines, of which the following is a specification.

My invention relates to improvements in lens-drilling machines or machines for drilling holes in lenses to receive the screws or rivets for attaching the mountings to the lenses used in spectacles and eyeglasses.

In the ordinary drilling-machines now in use for drilling holes in lenses means are provided for supporting and holding the lens in a plane at right angles to the plane of the drill, so that the hole drilled in the lens near the edge thereof will be parallel to the edge of the lens and extend through the lens in a direction at right angles to the horizontal plane of the lens. Such drilling-machines are particularly adapted to drill holes in the ordinary flat lenses having concave or convex faces and are not so well adapted to drill holes in "Coquille" or "Toric" lenses, so termed, which are now very generally used and which lenses have a considerable curvature in the arc of a circle.

The object of my invention is to provide a supplemental mechanism or attachment adapted to be combined with or applied to any ordinary lens-drilling machine and by means of which "Coquille" or "Toric" lenses, so termed, or lenses having a curvature in the arc of a circle, may be rigidly and positively supported in an inclined position and readily drilled, so that the hole through the lens, near the edge thereof, will be parallel to the edge of the lens and at the same distance from the edge of the lens on each face thereof and substantially at right angles to the surface of the lens where the hole is drilled.

My improvements may be used in connection with any ordinary form of holders or supports for the lens in a lens-drilling machine, and a lens-drilling machine provided with my improvements may be used for drilling the ordinary flat lenses or for drilling Coquille or Toric or curved lenses, as desired.

I have shown in the drawings a detached portion of a lens-drilling machine and my improvements combined with lens-holding jaws or supports of the construction shown and described in the United States Letters Patent No. 807,064; but it will be understood that my improvements may be combined with any other construction of holding jaws or supports used in lens-drilling machines.

Referring to the drawings, Figure 1 is a plan view of lens-holding jaws or supports and the holder or stand for the same, showing my improvements combined therewith and a Coquille or Toric lens in position to be drilled. Fig. 2 is an edge view of the parts shown at the right in Fig. 1 looking in the direction of arrow $a$, same figure, and also shows the drill-spindle. Fig. 3 is a section on line 3 3, Fig. 1, looking in the direction of arrow $b$, same figure, and also shows the drill-spindle. The lens is not shown in section. The broken lines show the opposite position of the lens. Fig. 4 corresponds to Fig. 3, but shows the opposite position of my supports. The full lines show the ordinary flat lens. Fig. 5 is a vertical section on line 5 5, Fig. 2, looking in the direction of arrow $c$, same figure. Fig. 6 is a cross-section on line 6 6, Fig. 2, looking in the direction of arrow $d$, same figure. Fig. 7 shows my support shown at the right in Fig. 2 detached. Fig. 8 is an edge view of the parts shown in Fig. 7 looking in the direction of arrow $e$, same figure. Fig. 9 is a plan view of the part shown in Fig. 7 looking in the direction of arrow $f$, same figure. Fig. 10 is an inside view of the spring-plate detached. Fig. 11 is an edge view of the spring-plate shown in Fig. 10 looking in the direction of arrow $g$, same figure; and Fig. 12 is the adjusting thumb-screw detached.

In the accompanying drawings, 1 is a stand or support for the two reciprocating bars 2 and 3, which have on their ends the curved lens-holding jaws or supports 2' and 3'. The bars 2 and 3 are moved in opposite directions, and the holding jaws or supports 2' and 3' are moved toward and away from each other in any desired manner, preferably by means of a pinion (not shown) meshing with rack-teeth on the inner edge of the bars 2 and 3, as fully shown and described in Patent No. 807,064, above referred to. The jaw 2' has in this instance thereon an inwardly-extending projection or plate 2'', and the jaw 3' has thereon an inwardly-extending projection or plate 3'' to support the inner end of a lens.

In connection with the holding jaws or supports 2' and 3' is shown in this instance an upright post 4, carrying a pin 4' to extend under the lens at a point in line with the drill-spindle 5. The post 4 is in this instance provided with an adjustable stop or gage 6 to engage the edge of the lens in the same manner as fully shown and described in said Patent No. 807,064. The above-described parts form no part of my invention except that the same may be used in connection with my improvements.

I will now describe my improvements.

The holding-jaws 2' and 3' have in this instance on their ends downwardly-extending vertical portions 2''' and 3''', which portions extend in a plane at right angles to the plane of the main portion of the holding-jaws 2' and 3'. Combined with the downwardly-extending portions 2''' and 3''' are the vertically-adjustable supports 7 for the outer end of the lens, which supports consist in this instance of a plate recessed upon its inner surface, as shown in Fig. 9, to receive the downwardly-extending portions 2''' and 3''' on the holding-jaws 2' and 3' and to have a vertical sliding movement thereon. Each support 7 is provided with a longitudinal opening 7' therethrough to receive the threaded end of a binding-screw 8, which passes loosely through said opening 7' and is screwed into a threaded hole in the downwardly-extending portions 2''' and 3'''. A flat leaf spring or plate 9 in this instance extends between the engaging end or head 8' of the screw 8 and the outside surface of the plate or support 7 and serves to yieldingly hold the plate or support 7 on the downwardly-extending end of the holding-jaws 2' and 3', so that said plate or support may be readily moved in a vertical plane from its higher position to its lower position, and vice versa. Extending inwardly from the inner edge of the plate or support 7 are two pins 7'', one near the upper end of the plate or support 7 and the other near the lower end.

The operation of my improvements and the vertically-adjustable supports 7 for the outer end of the lens will be readily understood by those skilled in the art. When the ordinary flat lens 10' is being drilled in the drilling-machine, the supports 7 are in their lower position, as shown in Fig. 4, with the upper pins or supports 7'' in the same horizontal plane as the inner supports 2'' and 3'', so that the ordinary flat lens (shown by full lines in Fig. 4) will extend in a horizontal plane and in a plane at right angles to the drill. When a Coquille or Toric or curved lens is being drilled, as shown in Fig. 3, my adjustable supports 7 will be moved upwardly to their highest position, and when the lens is drilled from the concave side the outer end of the lens will rest on the upper supports 7'', as shown by full lines, and the inner end of the lens will rest on the supports 2'' and 3'', as shown in Fig. 3. When the lens is in this position, a hole will be drilled which will be substantially at right angles to the surface of the lens where the hole is drilled. When the lens is drilled from the convex side, the outer end of the lens will rest on the lower supports 7'', as shown by broken lines in Fig. 3, and when the lens is in this position a hole will be drilled substantially at right angles to the lens where the hole is drilled. It will be understood that in drilling holes through lenses the hole is partially drilled from one side of the lens and the lens is then turned over and drilled from the other side. The amount of vertical movement of the plates or supports 7, carrying the pins 7'', may be regulated by the length of the slot 7' therein or by the position of the pins 7'' on said plates. When flat lenses (shown by full lines in Fig. 4) are being drilled, the lower supports 7'' will not be used. It will thus be seen that by means of my improvements, combined with the lens-holding jaws or supports, Coquille or Toric or curved lenses held in position and resting on supports may be drilled from either side thereof and the holes drilled therein will be parallel to the edge of the lens and at the same distance from the edge on each face of the lens and substantially at right angles to the lens where the hole is drilled.

It will be understood that my improvements may be combined with any ordinary form of drilling-machine to adapt said machine to drill Coquille or Toric or curved lenses, as well as plain or flat lenses, and by means of my improvements the Coquille or Toric or curved lens will be positively supported and held in proper position during the drilling operation to have the hole drilled through the lens parallel to the edge of the lens and the same distance from the edge of the lens on each face thereof and substantially at right angles to the lens where the hole is drilled.

It will be understood that the details of construction of my improvements may be varied, if desired, and they may be permanently attached to the lens-holding jaws or supports or removably attached and may be yieldingly held thereon, so as to be readily moved up or down or may be fixedly held thereon, as desired.

Having thus described my invention, what I claim as new, and desire to secure by Letters Patent, is—

1. In a lens-drilling machine, the combination with lens-holding jaws or supports, of plates attached to said jaws, and having pins or projections thereon for one end of a lens, said pins extending in two different horizontal planes, and means for holding said plates on said jaws.

2. In a lens-drilling machine, the combination with lens-holding jaws or supports movable toward and away from each other, and having vertically-extending projections on their ends, of plates adjustably attached to said projections to be moved in a vertical plane, and having supports thereon for one end of a lens, said supports extending in two different horizontal planes.

3. In a lens-drilling machine, the combination with lens-holding jaws or supports, of plates attached to said jaws, and having pins or projections thereon for one end of a lens, said pins extending in two different horizontal planes, and means for yieldingly holding said plates on said jaws.

EDGAR T. WAITE.

Witnesses:
ARTHUR C. MOORE,
JOHN C. F. WHEELOCK.